(12) United States Patent
Kasperchik et al.

(10) Patent No.: US 10,759,085 B2
(45) Date of Patent: Sep. 1, 2020

(54) THREE-DIMENSIONAL (3D) PRINTING (71) Applicant: Hewlett-Packard Development Company, L.P., Houston, TX (US)

(72) Inventors: Vladek Kasperchik, Corvallis, OR (US); Michael G. Monroe, Corvallis, OR (US); Pavel Kornilovich, Corvallis, OR (US); David A. Champion, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 303 days.

(21) Appl. No.: 15/763,193

(22) PCT Filed: Nov. 20, 2015

(86) PCT No.: PCT/US2015/061909
§ 371 (c)(1),
(2) Date: Mar. 26, 2018

(87) PCT Pub. No.: WO2017/086995
PCT Pub. Date: May 26, 2017

(65) Prior Publication Data
US 2018/0272561 A1 Sep. 27, 2018

(51) Int. Cl.
| | | |
|---|---|---|
| *B28B 1/00* | (2006.01) |
| *B33Y 30/00* | (2015.01) |
| *B33Y 10/00* | (2015.01) |
| *C04B 35/64* | (2006.01) |
| *C04B 35/63* | (2006.01) |
| *C04B 35/636* | (2006.01) |
| *C04B 35/638* | (2006.01) |
| *B33Y 50/02* | (2015.01) |
| *B28B 7/46* | (2006.01) |

(Continued)

(52) U.S. Cl.
CPC .............. *B28B 1/001* (2013.01); *B28B 7/465* (2013.01); *B33Y 10/00* (2014.12); *B33Y 30/00* (2014.12); *B33Y 50/02* (2014.12); *C04B 35/634* (2013.01); *C04B 35/636* (2013.01); *C04B 35/638* (2013.01); *C04B 35/6316* (2013.01); *C04B 35/64* (2013.01); *B29C 64/165* (2017.08); *B33Y 70/00* (2014.12)

(58) Field of Classification Search
None
See application file for complete search history.

(56) References Cited

U.S. PATENT DOCUMENTS 5,387,380 A * 2/1995 Cima ...................... B05C 19/04
264/69
6,596,224 B1 7/2003 Sachs et al.
(Continued)

FOREIGN PATENT DOCUMENTS

EP 1770176 4/2007
WO WO-2015106816 A1 7/2015

*Primary Examiner* — Mary Lynn F Theisen
(74) *Attorney, Agent, or Firm* — Dierker & Kavanaugh PC (57) ABSTRACT

In a three-dimensional printing method example, build material granules are applied. Each of the build material granules includes uncoated, primary ceramic particles agglomerated together by a binder that is soluble in a primary solvent of a fusing agent. The fusing agent is selectively applied on at least a portion of the build material granules. The binder dissolves and a green body including a slurry of the uncoated, ceramic particles is created.

12 Claims, 3 Drawing Sheets (51) Int. Cl.
*C04B 35/634* (2006.01)
*B29C 64/165* (2017.01)
*B33Y 70/00* (2020.01)

(56) References Cited

U.S. PATENT DOCUMENTS

| | | |
|---|---|---|
| 8,329,296 B2 | 12/2012 | Apel et al. |
| 2001/0050031 A1 | 12/2001 | Bredt et al. |
| 2004/0216860 A1 | 11/2004 | Pfeifer et al. |
| 2005/0276976 A1 | 12/2005 | Pfeifer et al. |
| 2006/0251535 A1 | 11/2006 | Pfeifer et al. |
| 2007/0241482 A1 | 10/2007 | Giller et al. |
| 2008/0152910 A1 | 6/2008 | Hesse et al. |
| 2009/0217882 A1 | 9/2009 | Jenkins |
| 2012/0237745 A1* | 9/2012 | Dierkes ............... A61K 6/807 428/215 |
| 2015/0218360 A1 | 8/2015 | Barber et al. |
| 2015/0259247 A1* | 9/2015 | Watanabe ............ C04B 12/025 264/642 |
| 2016/0083300 A1* | 3/2016 | Ide ..................... B28B 11/243 428/448 |
| 2016/0184891 A1* | 6/2016 | Mironets ............. B22F 1/0096 419/53 |
| 2017/0326792 A1* | 11/2017 | Paternoster ......... B29C 64/141 |
| 2018/0178447 A1* | 6/2018 | Abbott, Jr. ............. B33Y 70/00 |

* cited by examiner

THREE-DIMENSIONAL (3D) PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the three-dimensional (3D) printing method and the 3D printing system disclosed herein utilize Multi Jet Fusion (MJF). During some examples of multi jet fusion, a fusing agent is selectively applied to a layer of build material, and then another layer of the build material is applied thereon. The fusing agent may be applied to this other layer of build material, and these processes may be repeated to form a green body of the 3D part that is ultimately to be formed. The green body may then be exposed to heating and/or radiation to melt or sinter, densify, fuse, and harden the green body to form the 3D part.

The ability of the build material to be spread into thin layers with well controlled uniformity can affect the precision and quality of the 3D part that is formed. Build material particles that are less than 5 µm to 10 µm in size tend to form irregularly-shaped clumps due to strong Van Der Waals attraction between the particles. This clumping of build material degrades its ability to spread in to thin layers, and the fusing agent may not be able to spread uniformly among the build material, which can lead to 3D parts having imprecise shapes, varying structural properties, structural defects and/or varying visual qualities. Build material particles of at least 10 µm in size, and having a shape close to spherical, tend to spread well.

However, build materials, especially ceramic materials, with such a large particle size may be unable to be sintered efficiently. Ceramic particles tend to have very high melting temperatures (e.g., greater than 1000° C.). Therefore, in 3D printing, ceramic particles are usually sintered (which requires prolonged heating to temperatures ranging from about 60% to about 80% of the ceramic particle's melting temperature) rather than melted. Sintering is a diffusion based process, and therefore, sintering speed is dependent on the primary particle size. For the majority of ceramic materials, the sintering rate is inversely proportional to the material particle diameter in a power ranging from 2 to 4. Thus, an increase in build material particle diameter from 1 µm to 10 µm should slow down its sintering rate by a factor of $10^2$ to $10^4$. For the above reason, the sintering speed for ceramic particles with a particle size of few (1-10) µm or greater is impractically slow (e.g., months to years) for use in 3D printing. Additionally, 3D parts sintered from large, ceramic particles (e.g., greater than 10 µm) tend to be highly porous structures with larger inter-particle voids and tend to have compromised mechanical strength (e.g., less than 10% of bulk strength).

Heating large, ceramic particles at or slightly below the melting temperature may accelerate the fusing of the particles. However, if the melting temperature is exceeded, the build material particles may completely melt down leading to distorted parts (i.e., parts that have lost their shape). Additionally, heating at or slightly below the melting temperature may lead to fusing of the build material that does not have the fusing agent printed thereon (i.e., not part of the green body), which compromises edge boundary accuracy of the printed part. Still further, heating at or slightly below the melting temperature may lead to rapid redistribution of the build material particles, which can consolidate inter-particle voids into larger inter-particle voids. The resulting part may have compromised structural uniformity and mechanical strength.

Examples of the method and system disclosed herein utilize a substantially spherical, granular build material. Each build material granule is composed of uncoated, primary ceramic particles and a binder that holds the primary ceramic particles together. The build material granules are large enough (e.g., 10 µm) to enable thin layers with well controlled uniformity to be formed during spreading.

Additionally, the binder of the build material granules is selected so that it is soluble in a primary solvent of the fusing agent that is used during printing. Dissolution of the binder chemically breaks up the build material granules and forms a slurry of the uncoated, primary ceramic particles. The slurry is a layer of adequate structural uniformity that is composed of the uncoated, primary ceramic particles, which are densified as a result of binder dissolution, fluid evaporation, and capillary forces. The uncoated, primary ceramic particles are small enough (e.g., ≤3 µm) to sinter quickly (e.g., within about 1 hour to about 4 hours at a target temperature for the particles) and to produce a 3D part with good mechanical strength (e.g., from 10% to 20% of bulk strength).

As used herein "3D printed part," "3D part," "3D object," "object," or "part" may be a completed 3D printed part or a layer of a 3D printed part.

Figure 1:
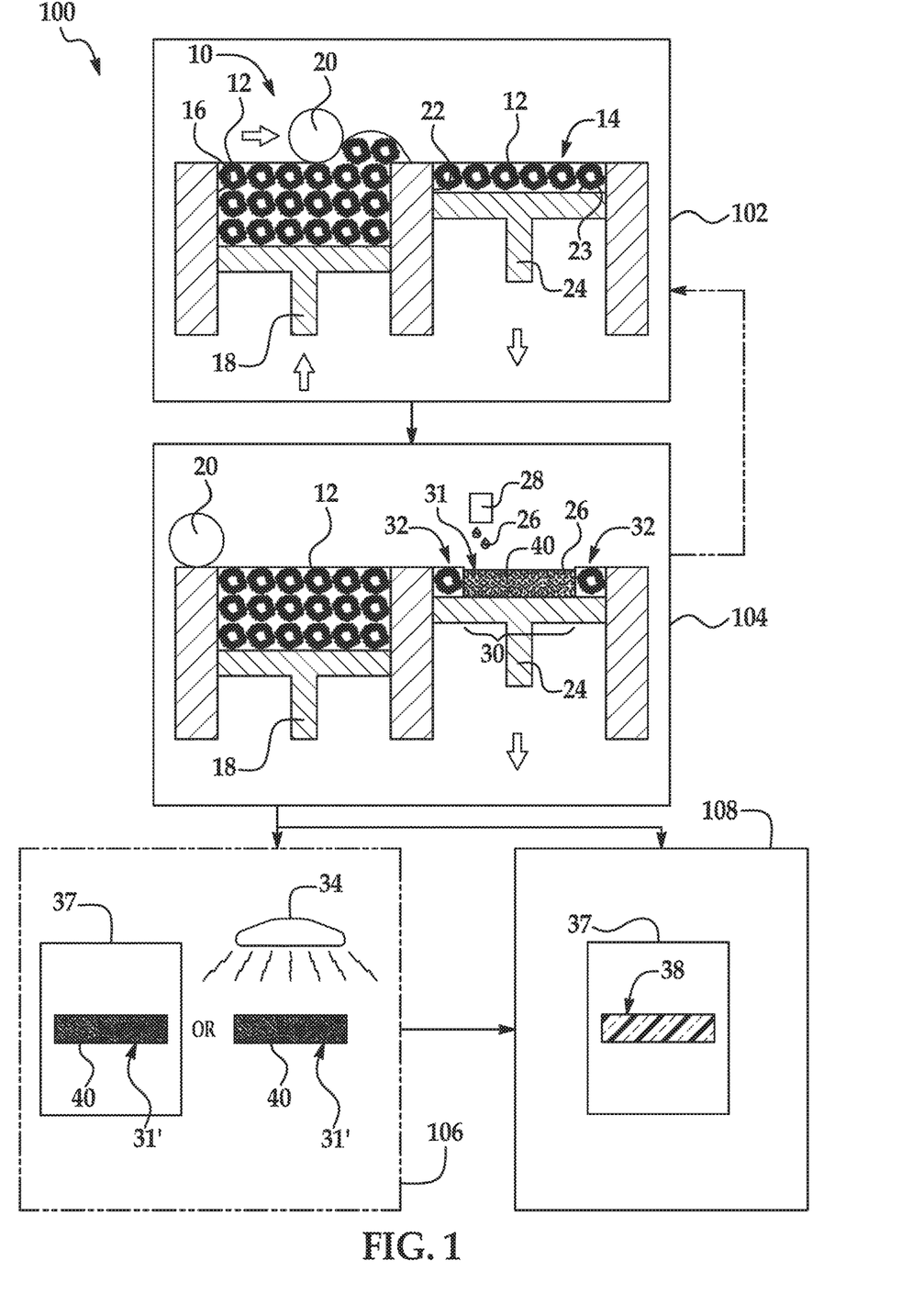
FIG. 1 is a flow diagram illustrating examples of a 3D printing method disclosed herein.

An example of the 3D printing method 100 is depicted in FIG. 1. As an example, the method 100 may be used to sinter ceramic particles, which are initially in the form of the build material granules 12. As shown at reference numeral 102 in FIG. 1, the method 100 includes applying the build material granules 12. One layer 14 of the build material granules 12 has been applied.

Figure 2:
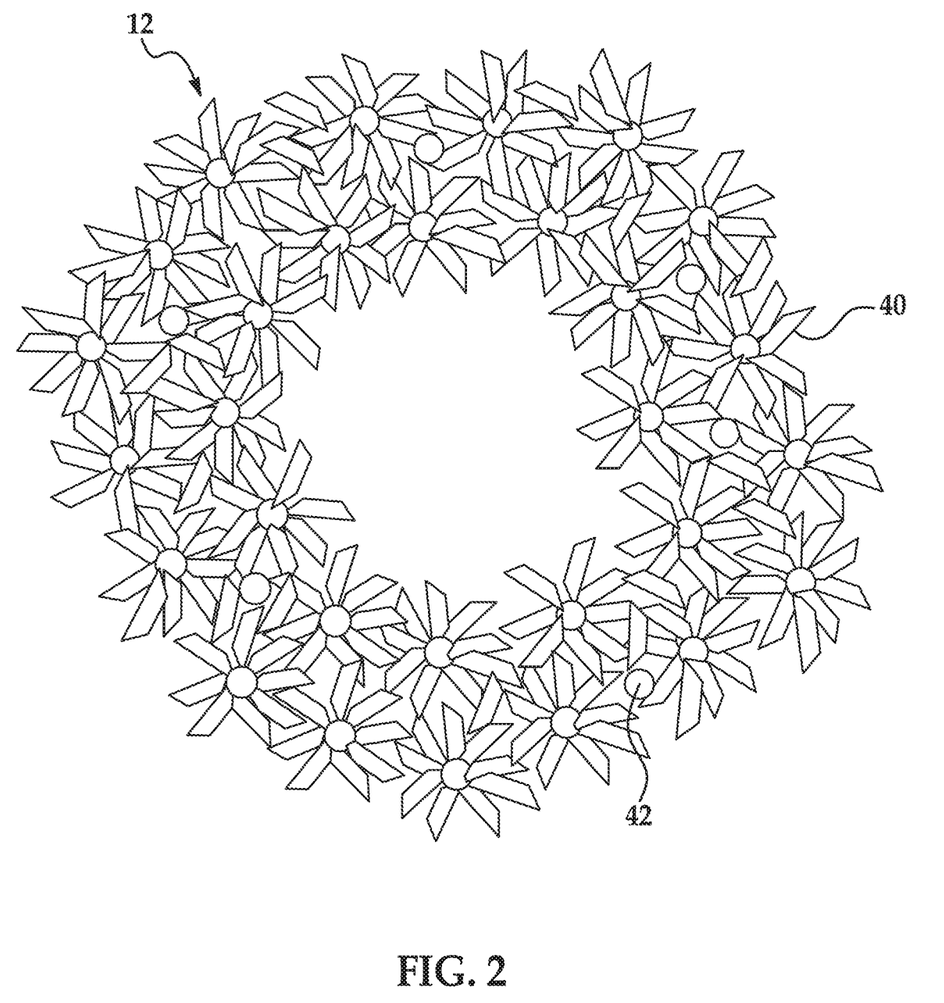
FIG. 2 is a schematic representation of an example of the build material granule used to form layer(s) of a 3D object.

FIG. 2 shows a schematic representation of the build material granule 12. The build material granule 12 includes uncoated, primary ceramic particles 40 and a binder 42. The uncoated, ceramic particles 40 are held together by the binder 42 to form the build material granules 12 (also referred to as granular agglomerates).

In an example, the build material granules 12 have a granule size ranging from about 10 µm to about 200 µm. In another example, the granule size ranges from about 20 µm to about 150 µm. The term "granule size" is used herein to describe the granule build material 12. The granule size generally refers to the diameter or average diameter of the composite granule build material 12, which may vary, depending upon the morphology of the composite. In an example, a respective build material granule 12 may have a morphology that is substantially spherical. A substantially spherical granule 12 (i.e., spherical or near-spherical) has a sphericity of >0.84. Thus, any individual granules 12 having a sphericity of <0.84 are considered non-spherical (irregularly shaped). The granule size of the substantially spherical granule 12 may be provided by its largest diameter, and the granule size of a non-spherical granule 12 may be provided by its average diameter (i.e., the average of multiple dimensions across the granule 12) or by an effective diameter, which is the diameter of a sphere with the same mass and density as the non-spherical granule 12.

In some examples, the build material granule 12 has a hollow center as shown in FIG. 2. In other examples, the build material 12 has a substantially filled in center.

The uncoated, primary ceramic particles 40 may be any bare ceramic particles. The bare ceramic particles do not have a coating, such as a chromophore coating, thereon. Examples of suitable uncoated, primary ceramic particles 40 include metal oxides, inorganic glasses, carbides, nitrides, and borides. Some specific examples include alumina ($Al_2O_3$), $Na_2O/CaO/SiO_2$ glass (soda-lime glass), silicon mononitride (SiN), silicon dioxide ($SiO_2$), zirconia ($ZrO_2$), titanium dioxide ($TiO_2$), or combinations thereof. As an example of one suitable combination, 30 wt % glass may be mixed with 70 wt % alumina.

In an example, the particle size of the uncoated, primary ceramic particles 40 ranges from 0.01 µm to about 3 µm. In another example, the particle size ranges from 0.05 µm to about 1.5 µm. The term "particle size" is used herein to describe the uncoated, primary ceramic particle 40. The particle size generally refers to the diameter or average diameter of the uncoated, primary ceramic particle 40, which may vary, depending upon the morphology of the particle 40. In an example, a respective uncoated, primary ceramic particle 40 may have a morphology that is substantially spherical. A substantially spherical particle 40 (i.e., spherical or near-spherical) has a sphericity of >0.84. Thus, any individual particles 40 having a sphericity of <0.84 are considered non-spherical (irregularly shaped). The particle size of the substantially spherical uncoated, primary ceramic particle 40 may be provided by its largest diameter, and the particle size of a non-spherical uncoated, primary ceramic particle 40 may be provided by its average diameter (i.e., the average of multiple dimensions across the particle 40) or by an effective diameter, which is the diameter of a sphere with the same mass and density as the non-spherical particle 40.

The ceramic particles 40 may be similarly sized particles or differently sized particles. In the example shown in FIG. 2, the ceramic particles 40 are similarly sized particles.

The binder 42 may be any material that i) has enough adhesive strength to hold the uncoated, primary ceramic particles 40 together to form the granules 12 with enough mechanical stability to survive limited handling (e.g., spreading the build material granules 12 into layers), and ii) is soluble in the primary solvent of the fusing agent 26 such that the granules 12 are converted into a slurry of the uncoated, primary ceramic particles 40.

One key property of the binder 42 is its solubility in the primary solvent used in the fusing agent 26. The binder solubility in the primary solvent should be higher than 0.5 wt %, when measured at a temperature corresponding to that of the printing environment. In some examples, the binder solubility is higher than 2 wt %. It is to be understood that there is no upper limit on the binder solubility in the primary solvent of the fusing agent 26, and the higher the solubility, the better.

The binder 42 may be a small molecular species or a short chain polymer that meets the criteria i and ii. Examples of suitable binders 42 include sugars, sugar alcohols, polymeric or oligomeric sugars, low or moderate molecular weight polycarboxylic acids, polysulfonic acids, water soluble polymers containing carboxylic or sulfonic moieties, and polyether alkoxy silane. Some specific examples include glucose ($C_6H_{12}O_6$), sucrose ($C_{12}H_{22}O_{11}$), fructose ($C_6H_{12}O_6$), maltodextrines with a chain length ranging from 2 units to 20 units, sorbitol ($C_6H_{14}O_6$), erythritol ($C_4H_{10}O_4$), mannitol ($C_6H_{14}O_6$), or CARBOSPERSE® K7028 (a short chain polyacrylic acid, M~2,300 Da, available from Lubrizol). Low or moderate molecular weight polycarboxylic acids (e.g., having a molecular weight less than 5,000 Da) may dissolve relatively fast. It is to be understood that higher molecular weight polycarboxylic acids (e.g., having a molecular weight greater than 5,000 Da up to 10,000 Da) may be used, however the dissolution kinetics may be slower.

In an example, the binder 42 is present in each granule 12 in an amount ranging from about 0.1 wt % to about 10 wt % based on the wt % of the primary ceramic particles 40 in each granule 12. In another example, the binder 42 is present in each granule 12 in an amount ranging from about 0.3 wt % to about 5 wt % based on the wt % of the primary ceramic particles 40 in each granule 12.

It is to be understood that in some instances the build material 12 consists of the uncoated, primary ceramic particles 40 and binder 42 alone.

A charging agent or a flow aid may be added in between the build material granules 12.

Charging agent(s) may be added to suppress tribo-charging. Examples of suitable charging agent(s) include aliphatic amines (which may be ethoxylated), aliphatic amides, quaternary ammonium salts (e.g., behentrimonium chloride orcocamidopropyl betaine), esters of phosphoric acid, polyethylene glycolesters, or polyols. Some suitable commercially available charging agents include HOSTASTAT® FA 38 (natural based ethoxylatedalkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 12.

Flow aid(s) may be added to improve the coating flowability of the build material granules 12. Flow aid(s) may be particularly beneficial when the build material granules 12 are less than 25 µm in granule size. The flow aid improves the flowability of the build material granules 12 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the build material granules 12.

While not shown in FIG. 1, the method 100 may further include preparing the build material granules 12. In one example, the build material granules 12 are prepared by dispersing the uncoated, primary ceramic particles 40 in a solution containing the binder 42. The solution may be based on water or a high vapor pressure solvent (e.g., isopropyl alcohol, ethanol, acetone, etc.) as the primary solvent. The solution containing the uncoated, primary ceramic particles 40 dispersed therein may then be spray dried. The solution may be passed through a spray nozzle or jet nebulizer (i.e., atomizer) at high pressure to create a high velocity mist (or aerosol) consisting of the solution droplets containing the uncoated, primary ceramic particles 40 and binder 42. The droplets may dry quickly (e.g., in less than 1 minute) to form the granular agglomerates that make up the build material 12. The spray drying process parameters, such as spraying nozzle diameter (e.g., ranging from 2 mm to 3 mm), solution pumping rate (e.g., ranging from 100 g/min to 200 g/min for a lab scale spray drier), inlet and outlet air temperatures (e.g., ranging from 60° C. to 150° C.), etc. may be altered to control the size distribution and/or morphology of the build material granules 12.

In some examples, the dried granular agglomerates (i.e., the build material granules 12) alone are used. In other examples, the charging agent(s) and/or flow aid(s) may be mixed in with the build material granules 12.

In the example shown at reference numeral 102, applying the build material granules 12 includes the use of the printing system 10. The printing system 10 may include a supply bed 16 (including a supply of the build material 12), a delivery piston 18, a roller 20, a fabrication bed 22 (having a contact surface 23), and a fabrication piston 24. Each of these physical elements may be operatively connected to a central processing unit (not shown) of the printing system. The central processing unit (e.g., running computer readable instructions stored on a non-transitory, tangible computer readable storage medium) manipulates and transforms data represented as physical (electronic) quantities within the printer's registers and memories in order to control the physical elements to create the 3D part 38. The data for the selective delivery of the build material granules 12, the fusing agent 26, etc. may be derived from a model of the 3D part to be formed. For example, the instructions may cause the controller to utilize a build material distributor to dispense the build material granules 12, and to utilize an applicator (e.g., an inkjet applicator) to selectively dispense the fusing agent 26.

The delivery piston 18 and the fabrication piston 24 may be the same type of piston, but are programmed to move in opposite directions. In an example, when a layer of the 3D part 38 is to be formed, the delivery piston 18 may be programmed to push a predetermined amount of the build material granules 12 out of the opening in the supply bed 16 and the fabrication piston 24 may be programmed to move in the opposite direction of the delivery piston 18 in order to increase the depth of the fabrication bed 22. The delivery piston 18 will advance enough so that when the roller 20 pushes the build material granules 12 into the fabrication bed 22 and onto the contact surface 23, the depth of the fabrication bed 22 is sufficient so that a layer 14 of the build material granules 12 may be formed in the bed 22. The roller 20 is capable of spreading the build material granules 12 into the fabrication bed 22 to form the layer 14, which is relatively uniform in thickness. In an example, the thickness of the layer 14 ranges from about 90 μm to about 110 μm, although thinner or thicker layers may also be used. For example, the thickness of the layer 14 may range from about 20 μm to about 200 μm, or from about 50 μm to about 200 μm.

It is to be understood that the roller 20 is a build material distributor that may be replaced by other tools, such as a blade that may be useful for spreading different types of powders, or a combination of a roller and a blade.

The supply bed 16 that is shown is one example, and could be replaced with another suitable delivery system to supply the build material granules 12 to the fabrication bed 22. Examples of other suitable delivery systems include a hopper, an auger conveyer, or the like.

The fabrication bed 22 that is shown is also one example, and could be replaced with another support member, such as a platen, a print bed, a glass plate, or another build surface.

After the build material granules 12 are applied at reference numeral 102, the fusing agent 26 is selectively applied on a portion 30 of the build material granules 12, in the layer 14, as shown at reference number 104.

As illustrated in FIG. 1 at reference numeral 104, the fusing agent 26 may be dispensed from an inkjet applicator, such as an inkjet printhead 28. While a single printhead is shown in FIG. 1 at reference numeral 104, it is to be understood that multiple printheads may be used that span the width of the fabrication bed 22. The printhead 28 may be attached to a moving XY stage or a translational carriage (neither of which is shown) that moves the printhead 28 adjacent to the fabrication bed 22 in order to deposit the fusing agent 26 in desirable area(s) 30.

The printhead 28 may be programmed to receive commands from the central processing unit and to deposit the fusing agent 26 according to a pattern of a cross-section for the layer of the 3D object that is to be formed. As used herein, the cross-section of the layer of the object to be formed refers to the cross-section that is parallel to the contact surface 23. In the example shown in FIG. 1 at reference numeral 104, the printhead 28 selectively applies the fusing agent 26 on those portion(s) 30 of the layer 14 that are to be fused to become the first layer of the 3D part 38. As an example, if the 3D part that is to be formed is to be shaped like a cube or cylinder, the fusing agent 26 will be deposited in a square pattern or a circular pattern (from a top view), respectively, on at least a portion of the layer 14 of the build material granules 12. In the example shown in FIG. 1 at reference numeral 104, the fusing agent 26 is deposited in a square pattern on the portion 30 of the layer 14 and not on the portions 32.

The fusing agent 26 includes at least the primary solvent. In some instances, the fusing agent 26 is the primary solvent, without any other components. The primary solvent in the fusing agent 26 is capable of dissolving the binder 42 in the build material granules 12, and thus the selection of the primary solvent is dependent upon the binder 42 used in the build material granules 12.

The fusing agent 26 may be water (i.e., water is the primary solvent). When water is used as the primary solvent, the binder 42 is water soluble.

In other examples, the fusing agent 26 may be a non-aqueous solvent (i.e., the non-aqueous solvent is the primary solvent). The non-aqueous solvent may be used as the primary solvent when the binder 42 is a non-polar material. The non-aqueous solvent may be a non-polar or medium polar primary solvent, such as ethanol, acetone, n-methyl pyrrolidone, and/or aliphatic hydrocarbons.

The nature of examples of the fusing agent 26 enables the fusing agent 26 to penetrate, at least partially, into the layer 14 of the build material granules 12, and to quickly dissolve the binder 42. The time is takes for the fusing agent 26 to dissolve the binder 42 depends on many factors, including binder solubility, environment temperature during the printing, binder/fluid ratio, structure of the granules 12, volumetric distribution of the binder 42 in the granules 12, etc. The binder 42 dissolution time may vary between seconds and many minutes, and in some instances, up to a few hours. The upper limit for the dissolution time may be the time that is required to print the green body in the powder/fabrication bed 22.

Other examples of the fusing agent 26 may include a heat or radiation absorbing agent (i.e., an active material). The active material may be any suitable material that absorbs heat and/or electromagnetic radiation. The active material may be selected to absorb heat and/or any wavelength in the electromagnetic spectrum. As examples, the electromagnetic radiation absorber may be capable of absorbing IR radiation (i.e., a wavelength of about 700 nm to about 1 mm, which includes near-IR radiation (i.e., a wavelength of 700 nm to 1.4 µm)), ultraviolet radiation (i.e., a wavelength of about 10 nm to about 390 nm), visible radiation (i.e., a wavelength from about 390 nm to about 700 nm), microwave radiation (i.e., a wavelength of about 1 mm to 1 about m), radio radiation (i.e., a wavelength from about 1 m to about 1000 m), or a combination thereof. An example of the active material may be a microwave radiation-absorbing susceptor, such as carbon black, graphite, magnetite, and/or various iron oxides. Carbon black may also be used as an IR (including near-IR) radiation absorber. Examples of other suitable radiation absorbers include visible dyes, or IR dyes, or any suitable colorants having radiation absorption bands within the visible spectrum of electromagnetic radiation.

As one example, the fusing agent 26 may be an ink-type formulation including carbon black, such as, for example, the ink formulation commercially known as CM997A available from Hewlett-Packard Company. Within the fusing agent 16, the carbon black may be polymerically dispersed. The carbon black pigment may also be self-dispersed within the fusing agent 26 (e.g., by chemically modifying the surface of the carbon black). Examples of inks including visible light enhancers are dye based colored ink and pigment based colored ink, such as the commercially available inks CE039A and CE042A, available from Hewlett-Packard Company.

Examples of suitable carbon black pigments that may be included in the fusing agent 26 include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4).

As mentioned above, the carbon black pigment may be polymerically dispersed within the fusing agent 26 by a polymeric dispersant having a weight average molecular weight ranging from about 12,000 to about 20,000. In this example, the fusing agent 26 includes the carbon black pigment (which is not surface treated), the polymeric dispersant, and water (with or without a co-solvent). When included, an example of the co-solvent may be 2-pyrollidinone. The polymeric dispersant may be any styrene acrylate or any polyurethane having its weight average molecular weight ranging from about 12,000 to about 20,000. Some commercially available examples of the styrene acrylate polymeric dispersant are JONCRYL® 671 and JONCRYL® 683 (both available from BASF Corp.). Within the fusing agent 26, a ratio of the carbon black pigment to the polymeric dispersant ranges from about 3.0 to about 4.0. In an example, the ratio of the carbon black pigment to the polymeric dispersant is about 3.6. It is believed that the polymeric dispersant contributes to the carbon black pigment exhibiting enhanced electromagnetic radiation absorption.

In another example, the active material includes metal nanoparticles. In one example, the metal nanoparticles are silver (Ag), copper (Cu), or zinc (Zn). Other examples of suitable metal nanoparticles include metal alloys (where the metals are selected from, for example, Ag, Au, Cu, Ni, Rh, Ru, Mo, Ta, Ti, Pt, or Pd), metal oxide (e.g., iron oxide), metal coated oxide (e.g., iron oxide coated with Ag, Au or Pt), cadmium selenide, and metal coated silica (e.g., silica coated with Ag or Au).

The amount of the active material that is present in the fusing agent 26 ranges from 0 wt % to about 40 wt % based on the total wt % of the fusing agent 26. In other examples, the amount of the active material in the fusing agent 26 ranges from about 0.3 wt % to 30 wt %, or from about 1 wt % to about 20 wt %. It is believed that these active material loadings provide a balance between the fusing agent 26 having jetting reliability and heat and/or electromagnetic radiation absorbance efficiency.

The presence of a co-solvent, a surfactant, and/or a dispersant in the fusing agent 26 may assist in obtaining a particular wetting behavior with the build material granules 12. In some instances, the fusing agent 26 consists of water or other primary solvent, either alone or with the active material. In other instances, the fusing agent 26 may further include a dispersing additive, a surfactant, a co-solvent, a biocide, an anti-kogation agent, and combinations thereof.

Surfactant(s) may be used to improve the wetting properties and the jettability of the fusing agent 26. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.)

or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 26 may range from about 0.5 wt % to about 1.4 wt % based on the total wt % of the fusing agent 26.

Some examples of the co-solvent (for the water-based fusing agent 26) include 1-(2-hydroxyethyl)-2-pyrollidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1 (LEG-1), and combinations thereof.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.05 wt % to about 0.5 wt % with respect to the total wt % of the fusing agent 26.

An anti-kogation agent may be included in the fusing agent 26. Kogation refers to the deposit of dried ink (e.g., fusing agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the fusing agent 26 may range from greater than 0.20 wt % to about 0.62 wt % based on the total wt % of the fusing agent 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.015 wt %.

It is to be understood that a single fusing agent 26 may be selectively applied to form the layer of the 3D part 38, or multiple fusing agents 26 may be selectively applied to form the layer of the 3D part 38. When multiple fusing agents 26 are utilized, the primary solvent of each of the fusing agents may be capable of dissolving the binder 42 in the build material granules 12.

After the fusing agent 26 is selectively applied in the desired portion(s) 30, the binder 42 in contact with the fusing agent 26 dissolves, creating a slurry of the primary ceramic particles 40 at the portion(s) 30. Upon dissolution of the binder 42, the build material granules 12 are broken up and converted into the concentrated slurry of the ceramic particles 40. At room temperature or at the temperature of the fabrication bed 22 (which may be heated), some of the fluid from the fusing agent 26 may evaporate after it is dispensed. The dissolution of the binder 42 and the fluid evaporation results in the densification of the primary ceramic particles 40, due to the particles 40 filling intergranule voids that were present between the granules 12. The densified and partially dried slurry forms a green body 31 (or a layer of the green body 31) in the fabrication bed 22.

The densified and partially dried slurry of the ceramic particles 40 is held together by capillary forces. It is to be understood that the green body 31 (i.e., the slurry of ceramic particles 40) is denser than the layer 14 of the build material granules 12.

It is to be understood that in portions 32 of the build material granules 12 that do not have the fusing agent 26 applied thereto, the binder 42 does not dissolve and the slurry and the green body 31 are not formed. As such, in portions 32, the build material granules 12 remain intact.

While the green body 31 (reference numeral 104) is shown as a single layer, it is to be understood that the green body 31 (and thus the resulting part 38, shown at reference numeral 108) may be built up to include several layers. Each additional layer of the green body 31 may be formed by repeating reference numerals 102-104. For example, to form an additional layer of the green body 31, an additional layer of the build material granules 12 may be applied to the green body 31 shown in reference numeral 104 and the additional layer may have the fusing agent 26 selectively applied thereto (dissolving the binder 42 and creating a slurry of the ceramic particles 40). Any number of additional layers may be formed.

When the green body 31 is complete, it may be exposed to several heating stages (e.g., initial, lower temperature heating to further densify the green body 31, followed by higher temperature sintering), or it may be exposed to a single heating stage that sinters the green body 31. In the example of method 100 involving multi-stage heating, the method 100 moves from reference numeral 104 to 106 to 108. In the example of method 100 involving single-stage heating, the method 100 moves from reference numeral 104 to 108.

Prior to heating, the green body 31 is removed from the fabrication bed 22 (or other support member) and is placed in a suitable heat source 37 or in proximity of a suitable radiation source 34 (both of which are shown at reference numeral 106).

Examples of the heat source 37 include a conventional furnace or oven, a microwave (which may also be considered a radiation source 34), or devices capable of hybrid heating (i.e., conventional heating and microwave heating). Examples of the radiation source 34 include a UV, IR or near-IR curing lamp, IR or near-IR light emitting diodes (LED), halogen lamps emitting in the visible and near-IR range, or lasers with the desirable electromagnetic wavelengths. When the radiation source 34 is used, the type of radiation source 34 will depend, at least in part, on the type of active material used in the fusing agent 26. Performing initial heating with the radiation source 34 may be desirable when the fusing agent 26 includes the active material therein. The active material may enhance the absorption of the radiation, convert the absorbed radiation to thermal energy, and thus promote the initial heating of the green body 31.

When multi-stage heating is utilized, the green body 31 may first be heated, using heat source 37 or radiation source 34, to a temperature ranging from about 200° C. to about 600° C. Heating the green body 31 removes at least some more fluid from the slurry of the primary ceramic particles 40 to further compact and densify the green body 31 to form the green body 31'. Since initial heating of the green part 31 may remove at least some of the fluid therefrom, the (partially dried) green body 31' is denser and more compact than the initial green body 31 formed of the slurry. This initial heating promotes additional cohesion of the primary ceramic particles 40 within the green body 31'.

As mentioned above, the initial heating at reference numeral 106 may be performed, and the green body 31' may then be exposed to sintering at reference numeral 108, or the initial heating at reference numeral 106 may be bypassed, and the green body 31 may be exposed to sintering (reference numeral 108).

Whether or not the initial heating is performed, the green body 31 or 31' may then be exposed to a heating process that will sinter the green body 31 or 31'. As shown at reference numeral 108, heat source 37 may be used for sintering the green body 31, 31' to form the part/object 38.

During heating/sintering, the green body 31 or 31' may be heated to a temperature ranging from about 40% to about 90% of the melting temperature of the primary ceramic particles 40. In an example, the green body 31 or 31' may be heated to a temperature ranging from about 50% to about 80% of the melting temperature of the primary ceramic particles 40. The heating temperature thus depends, at least in part, upon the primary ceramic particles 40 that are utilized. The heating temperature may also depend upon the particle size and time for sintering (i.e., high temperature exposure time). In some examples, the heating temperature of the green body 31 or 31' ranges from about 900° C. to about 2000° C., or from about 1400° C. to about 1700° C. The heating at reference numeral 108 sinters and fuses the primary ceramic particles 40 to form the layer or part/object 38, which may be even further densified relative to the green body 31 or 31'.

The length of time for sintering may be dependent, for example, on one or more of: characteristics of the heating source 37; characteristics of the primary ceramic particles 40; and/or characteristics of the fusing agent 26.

Due in part to the uniformity of the original layer 14 of build material granules 12 and the ability of the fusing agent 26 to dissolve the binder 42 and break apart the build material granules 12 to form the denser green body 31, the resulting 3D part 38 has good structural properties (e.g., strength).

Figure 3:
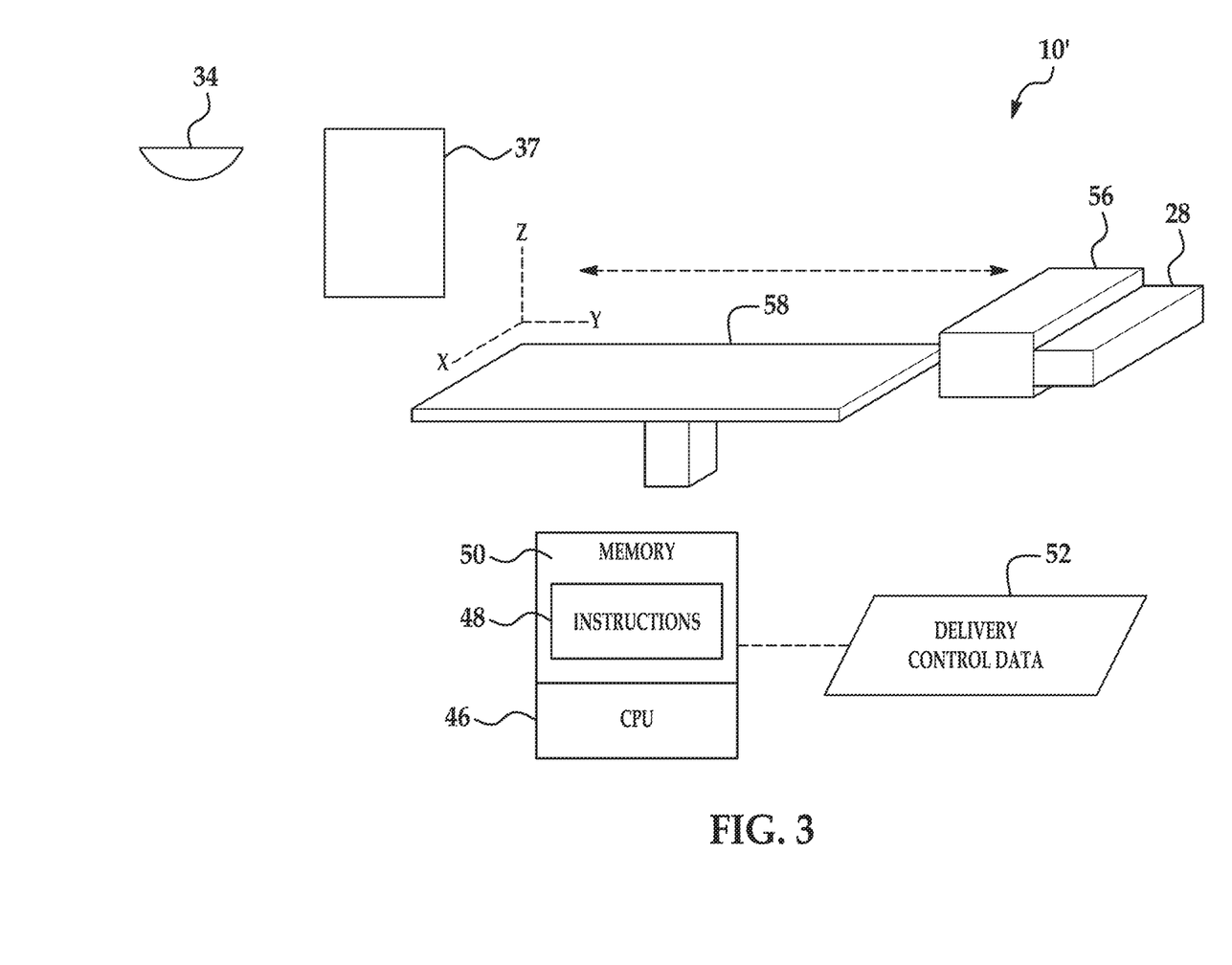
FIG. 3 is a simplified isometric view of an example of a 3D printing system disclosed herein.

Referring now to FIG. 3, another example of the printing system 10' is depicted. The system 10' includes a central processing unit 46 that controls the general operation of the additive printing system 10'. As an example, the central processing unit 46 may be a microprocessor-based controller that is coupled to a memory 50, for example via a communications bus (not shown). The memory 50 stores the computer readable instructions 48. The central processing unit 46 may execute the instructions 48, and thus may control operation of the system 10' in accordance with the instructions 48.

In this example, the printing system 10' includes a fusing agent distributor 28 to selectively deliver fusing agent 26 to portion(s) 30 of the layer (not shown in this figure) of build material granules 12 provided on a support member 58.

The central processing unit 46 controls the selective delivery of the fusing agent 26 to the layer of the build material 12 in accordance with delivery control data 52.

In the example shown in FIG. 3, it is to be understood that the distributor 28 is a printhead(s), such as a thermal printhead(s) or a piezoelectric inkjet printhead(s). The printhead(s) 28 may be a drop-on-demand printhead(s) or a continuous drop printhead(s).

The printhead(s) 28 may be used to selectively deliver the fusing agent 26, when in the form of a suitable fluid. As described above, the fusing agent 26 may be a water-based dispersion, to enable it to be delivered via the printhead(s) 28.

In one example, the printhead(s) 28 may be selected to deliver drops of the fusing agent 26 at a resolution ranging from about 300 dots per inch (DPI) to about 1200 DPI. In other examples, the printhead(s) 28 may be selected to be able to deliver drops of the fusing agent 26 at a higher or lower resolution. The drop velocity may range from about 5 m/s to about 24 m/s and the firing frequency may range from about 1 kHz to about 100 kHz.

The printhead(s) 28 may include an array of nozzles through which the printhead(s) 28 is able to selectively eject drops of fluid. In one example, each drop may be in the order of about 10 pica liters (pl) per drop, although it is contemplated that a higher or lower drop size may be used. In some examples, printhead(s) 28 is able to deliver variable size drops.

The printhead(s) 28 may be an integral part of the printing system 10', or it may be user replaceable. When the printhead(s) 28 is user replaceable, they may be removably insertable into a suitable distributor receiver or interface module (not shown).

As shown in FIG. 3, the distributor 28 may have a length that enables it to span the whole width of the support member 58 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 58. In other examples of the printing system 10', the distributor 28 may have a shorter length that does not enable it to span the whole width of the support member 58.

While not shown in FIG. 3, it is to be understood that the distributor 28 may be mounted on a moveable carriage to enable it to move bi-directionally across the length of the support member 58 along the illustrated y-axis. This enables selective delivery of the fusing agent 26 across the whole width and length of the support member 58 in a single pass. In other examples, the distributor 28 may be fixed while the support member 58 is configured to move relative thereto.

As used herein, the term 'width' generally denotes the shortest dimension in the plane parallel to the X and Y axes shown in FIG. 3, and the term 'length' denotes the longest dimension in this plane. However, it is to be understood that in other examples the term 'width' may be interchangeable with the term 'length'. As an example, the distributor 28 may have a length that enables it to span the whole length of the support member 58 while the moveable carriage may move bi-directionally across the width of the support member 58.

In examples in which the distributor 28 has a shorter length that does not enable it to span the whole width of the support member 58, the distributor 28 may also be movable bi-directionally across the width of the support member 58 in the illustrated X axis. This configuration enables selective delivery of the fusing agent 26 across the whole width and length of the support member 58 using multiple passes.

The distributor 28 may include therein a supply of the fusing agent 26 or may be operatively connected to a separate supply of the fusing agent 26.

As shown in FIG. 3, the printing system 10' also includes a build material distributor 56. This distributor 56 is used to provide the layer (e.g., layer 14) of the build material granules 12 on the support member 58. Suitable build material distributors 56 may include, for example, a wiper blade, a roller, or combinations thereof.

The build material granules 12 may be supplied to the build material distributor 56 from a hopper or other suitable delivery system. In the example shown, the build material distributor 56 moves across the length (Y axis) of the support member 58 to deposit a layer of the build material granules 12. As previously described, a first layer of build material granules 12 will be deposited on the support member 58, whereas subsequent layers of the build material granules 12 will be deposited on a previously deposited layer that has been exposed to the fusing agent 26.

It is to be further understood that the support member 58 may also be moveable along the Z axis. In an example, the support member 58 is moved in the Z direction such that as new layers of build material granules 12 are deposited, a predetermined gap is maintained between the surface of the most recently formed layer and the lower surface of the distributor 28. In other examples, however, the support member 58 may be fixed along the Z axis and the distributor 28 may be movable along the Z axis.

Similar to the system 10 (shown in FIG. 1), the system 10' also includes the heating source 37, alone or in combination with the radiation source 34 to apply heat to the green body 31, 31' to cause drying and densification of portion(s) 30 of slurry of the ceramic particles 40 and ultimately to sinter the green body 31, 31'. Any of the previously described heat sources 37 and radiation sources 34 may be used.

The central processing unit 46 may control the heat source 37 and/or radiation source 34. The amount of heat applied may be in accordance with delivery control data 52.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 10 µm to about 200 µm should be interpreted to include not only the explicitly recited limits of about 10 µm to about 200 µm, but also to include individual values, such as 37 µm, 45 µm, 70.5 µm, 195 µm, etc., and sub-ranges, such as from about 50 µm to about 190 µm, from about 25 µm to about 80 µm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
    applying build material granules, each of the build material granules including a plurality of uncoated, primary ceramic particles agglomerated together by a binder that is soluble in a primary solvent of a fusing agent; and
    selectively applying the fusing agent on at least a portion of the build material granules, thereby dissolving the binder and creating a green body including a slurry of the uncoated, primary ceramic particles;
    wherein:
        each of the build material granules has a granule size ranging from about 10 microns to about 200 microns; and
        each of the uncoated, primary ceramic particles has a particle size ranging from about 0.01 microns to about 3 microns.

2. The method as defined in claim 1 wherein the green body is denser than the applied build material granules.

3. The method as defined in claim 1, further comprising:
    heating the green body to a temperature ranging from about 200° C. to about 600° C., thereby densifying the green body; and
    then heating the green body to a temperature that ranges from about 40% to about 90% of a melting point of the uncoated, primary ceramic particles, thereby fusing the uncoated, primary ceramic particles of the green body to form a part.

4. The method as defined in claim 1, further comprising:
    removing the green body from a fabrication bed or a support member on which it is created;
    placing the green body in a heating mechanism; and
    sintering the green body to form a part.

5. The method as defined in claim 1 wherein prior to applying the build material granules, the method further comprises:
    dispersing the uncoated, primary ceramic particles in a solution containing the binder; and
    spray drying the solution containing the uncoated, primary ceramic particles dispersed therein, thereby creating the build material granules.

6. The method as defined in claim 1 wherein the uncoated, primary ceramic particles are metal oxide ceramics, inorganic glasses, carbides, nitrides, borides, or a combination thereof.

7. The method as defined in claim 1 wherein the binder is a sugar, a sugar alcohol, a polymeric sugar, an oligomeric sugar, a polycarboxylic acid, polysulfonic acid, a water soluble polymer containing carboxylic or sulfonic moieties, a polyether alkoxy silane, or a combination thereof.

8. The method as defined in claim 1 wherein the binder is present in an amount ranging from about 0.1 wt % to about 10 wt % based on a wt % of the uncoated, primary ceramic particles.

9. The method as defined in claim 1 wherein each of the build material granules is substantially spherical.

10. A three-dimensional (3D) printing system, comprising:
    a supply of build material granules, each of the build material granules including a plurality of uncoated, primary ceramic particles agglomerated together by a binder that is soluble in a primary solvent of a fusing agent, wherein: each of the build material granules has a granule size ranging from about 10 microns to about 200 microns; and each of the uncoated, primary ceramic particles has a particle size ranging from about 0.01 microns to about 3 microns;
    a build material distributor;
    a supply of the fusing agent;
    an ink applicator for selectively dispensing the fusing agent;
    a controller; and
    a non-transitory computer readable medium having stored thereon computer executable instructions to cause the controller to:
        utilize the build material distributor to dispense the build material granules; and utilize the inkjet applicator to selectively dispense the fusing agent to form a green body from at least some of the build material granules.

11. The system as defined in claim 10 wherein:
the uncoated, primary ceramic particles are metal oxide ceramics, inorganic glasses, carbides, nitrides, borides, or a combination thereof; and the binder is a sugar, a sugar alcohol, a polymeric sugar, an oligomeric sugar, a polysulfonic acid, a water soluble polymer containing carboxylic or sulfonic moieties, a polycarboxylic acid, a polyether alkoxy silane, or a combination thereof.

12. The system as defined in claim 10 wherein the binder is present in an amount ranging from about 0.1 wt % to about 10 wt % based on a wt % of the uncoated, primary ceramic particles.

* * * * *